United States Patent
Ungchusri et al.

(10) Patent No.: US 6,595,555 B2
(45) Date of Patent: Jul. 22, 2003

(54) COILED TUBING SWIVEL WITH STEPPED BEARING RACES

(75) Inventors: Tep Ungchusri, The Woodlands, TX (US); Steven L. Schwegman, Spring, TX (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 09/952,610

(22) Filed: Sep. 13, 2001

(65) Prior Publication Data

US 2003/0047944 A1 Mar. 13, 2003

(51) Int. Cl.[7] ................................................ F16L 27/04
(52) U.S. Cl. ........................................ 285/276; 384/512
(58) Field of Search .............................. 285/272, 121.5, 285/121.3, 190, 273, 274, 276; 384/512, 513

(56) References Cited

U.S. PATENT DOCUMENTS

| | | | |
|---|---|---|---|
| 990,946 A | | 5/1911 | Badger |
| 1,325,113 A | * | 12/1919 | Rohn .......................... 384/512 |
| 1,452,603 A | * | 4/1923 | Himes ......................... 384/513 |
| 2,701,146 A | * | 2/1955 | Warren ..................... 285/121.5 |
| 4,418,947 A | | 12/1983 | Talafuse |
| 4,753,291 A | * | 6/1988 | Smith et al. ................ 166/65.1 |
| 5,415,441 A | * | 5/1995 | Kilgore et al. .............. 285/322 |
| 6,029,695 A | * | 2/2000 | Logan ......................... 137/580 |
| 6,164,707 A | * | 12/2000 | Ungchusri et al. ........... 285/276 |

FOREIGN PATENT DOCUMENTS

| | | |
|---|---|---|
| GB | 174917 | 3/1922 |
| GB | 263458 | 12/1926 |

* cited by examiner

Primary Examiner—Lynne H. Browne
Assistant Examiner—G M Collins
(74) Attorney, Agent, or Firm—Henry C. Query, Jr.

(57) ABSTRACT

The invention is directed to a coiled tubing swivel for rotatably connecting a first conduit to a second conduit. The swivel comprises a swivel body having a cylindrical receptacle and a flowpath that communicates between the receptacle and the first conduit, a tubular mandrel having a first end that is received within the receptacle and a second end which communicates with the second conduit, and a bearing assembly positioned between the receptacle and the mandrel. The bearing assembly includes a central axis, a cylindrical outer sleeve having an inner surface and a number of annular inner grooves which are formed on the inner surface coaxially with the central axis, and a cylindrical inner sleeve having an outer surface and a number of annular outer grooves which are formed on the outer surface coaxially with the central axis. The outer grooves align with respective inner grooves to define a number of bearing races, and a plurality of balls are disposed in the bearing races to rotatably secure the inner sleeve to the outer sleeve. Moreover, each bearing race comprises a diameter which is smaller than the diameter of the adjacent bearing race that is closer to the first end of the mandrel. In addition, the swivel comprises a packing for sealing the bearing assembly from the flowpath in the swivel body.

10 Claims, 2 Drawing Sheets

COILED TUBING SWIVEL WITH STEPPED BEARING RACES

BACKGROUND OF THE INVENTION

The present invention relates to a swivel which is used to connect a conduit to a string of coiled tubing which is wound upon a reel. More particularly, the invention relates to such a swivel which comprises a mandrel that is rotatably connected to the swivel body with a separate bearing assembly.

Coiled tubing swivels are used in, among other applications, the drilling, cementing and stimulation of oil and gas wells to provide for fluid communication between a service conduit and a coiled tubing string that extends into the well as the coiled tubing string is wound upon or unwound from a reel. Prior art coiled tubing swivels typically include a tubular mandrel which is rotatably received within a cylindrical receptacle that is formed in a swivel body. The swivel body comprises an internal flow path which extends between the receptacle and a port that communicates with the exterior of the swivel body. The coiled tubing string is connected to either the mandrel or the port, and the service conduit is connected to the other of the mandrel or the port. In this manner, fluid communication is established between the coiled tubing string and the service conduit through the swivel.

Prior art coiled tubing swivels also include a conventional swivel assembly to permit the mandrel to rotate relative to the swivel body when the coiled tubing is being wound onto or unwound from the reel. This conventional swivel assembly typically comprises a standard thrust bearing and a relatively complex journal bearing which are designed to withstand the side and bending loads that are imparted on the mandrel. The journal bearing usually includes a number of coaxial bearing races which are defined by matching annular grooves that are formed in the receptacle and on the outer diameter of the mandrel. Once the mandrel is positioned in the receptacle, a plurality of balls are inserted into the bearing races to rotatably secure the mandrel to the swivel body.

The coiled tubing swivel must be capable of containing common service and production fluids at significant pressures and flow rates. Thus, the journal bearing must be made of a material that is sufficiently hard to meet the anticipated bearing load capacity. In addition, the mandrel and the swivel body must be made of materials that will not erode or corrode in the presence of the service fluids which will be conveyed through the swivel. However, materials which are compatible with the service fluids are typically not sufficiently hard for bearing races. Thus, a compromise is often reached by making the mandrel and the swivel body larger than would normally be required in order to increase the amount of material in the areas of the bearing races to ensure that the races will not fail. However, this adds size and weight to the swivel.

SUMMARY OF THE INVENTION

The present invention addresses these and other disadvantages in the prior art by providing a coiled tubing swivel for rotatably connecting a first conduit to a second conduit, one of which comprises a string of coiled tubing which is wound upon a reel. The swivel comprises a swivel body which includes a cylindrical receptacle and a flowpath that extends between the receptacle and a port which communicates with the first conduit. The swivel also comprises a tubular mandrel which includes a first end that is received within the receptacle, a second end that communicates with the second conduit, a longitudinal hole that extends between the first and second ends, an outer diameter surface and a flange that extends radially outwardly from the outer diameter surface generally proximate the first end. The swivel further comprises a bearing assembly which is positioned between the receptacle and the mandrel and which includes a central axis, a cylindrical outer sleeve that comprises an inner surface and a number of annular inner grooves which are formed on the inner surface coaxially with the central axis, a cylindrical inner sleeve that comprises an outer surface and a number of annular outer grooves which are formed on the outer surface coaxially with the central axis, wherein the outer grooves align with respective inner grooves to define a number of bearing races, and a plurality of balls that are disposed in the bearing races to rotatably secure the inner sleeve to the outer sleeve. The swivel also includes a seal for sealing the bearing assembly from the flowpath in the swivel body, and a retainer for retaining the bearing assembly within the receptacle. Furthermore, the flange is positioned between the bearing assembly and the swivel body to thereby secure the mandrel within the receptacle.

In a preferred embodiment of the invention, each bearing race comprises a diameter which is smaller than the diameter of the adjacent bearing race which is closer to the first end of the mandrel. In a more preferred embodiment of the invention, the diameter of each bearing race is selected such that each bearing race will hold one less ball than the adjacent bearing race which is closer to the first end of the mandrel.

Thus, the present invention provides a swivel which comprises a separate bearing assembly that is isolated from the fluid in the flowpath. Consequently, the bearing assembly can be made of a material which is not compatible with the fluid. In addition, the bearing races are preferably stepped, with the diameter of each bearing race being smaller than the diameter of each adjacent bearing race which is closer to the first end of the mandrel. In this manner, should the balls or the bearing races fail, the inner and outer sleeves will engage and prevent the mandrel from separating from the swivel body.

These and other objects and advantages of the present invention will be made more apparent from the following detailed description, with reference to the accompanying drawings.

DETAILED DESCRIPTION OF THE PREFERRED EMBODIMENTS

Figure 1:
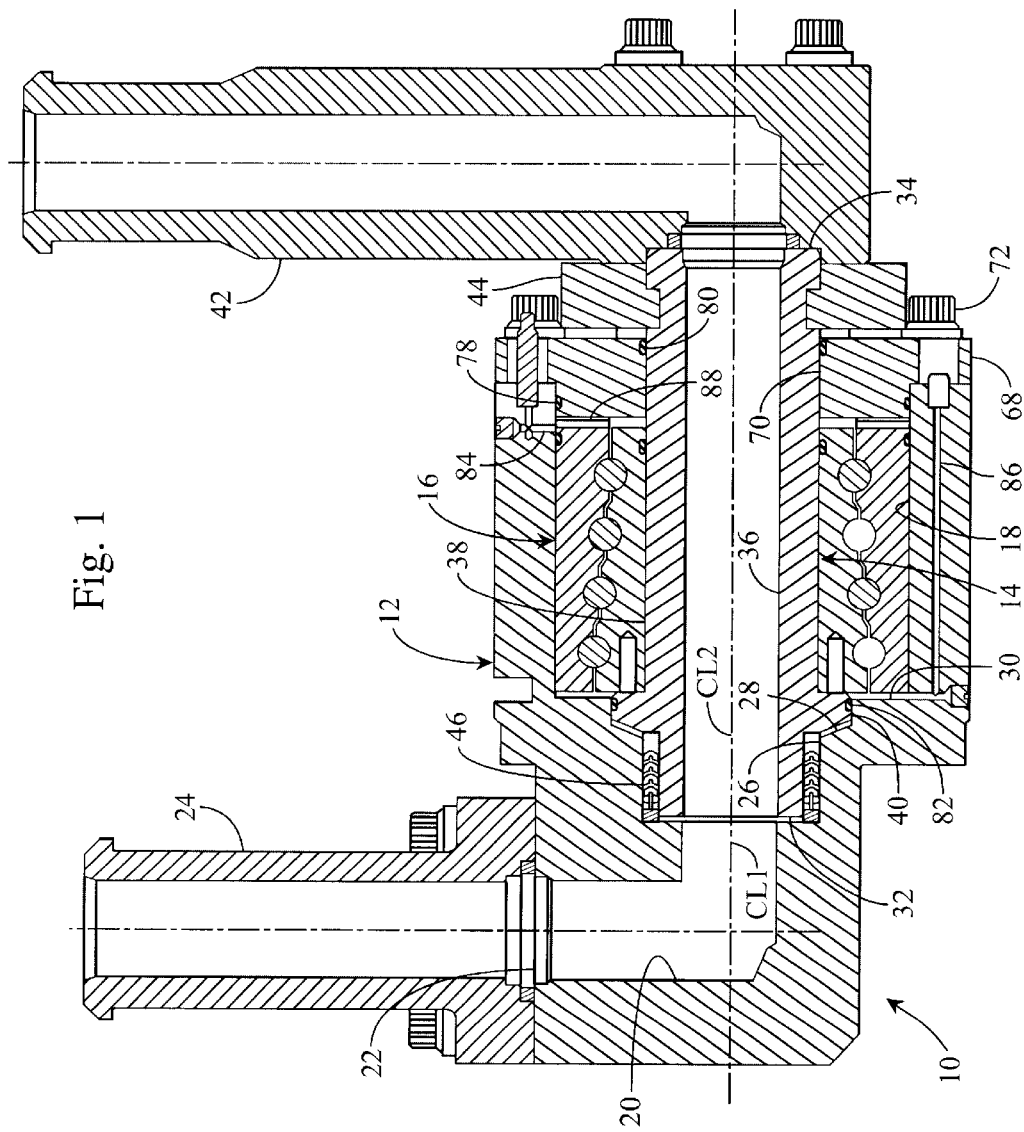
FIG. 1 is a longitudinal cross sectional view of the coiled tubing swivel of the present invention.

Referring to FIG. 1, the coiled tubing swivel of the present invention, which is indicated generally by reference number 10, is shown to comprise a swivel body 12, a tubular mandrel 14 and a bearing assembly 16 which rotatably connects the mandrel to the swivel body. The swivel 10 is typically connected to a reel (not shown) upon which a coiled tubing string (not shown) is wound. The coiled tubing string is connected to one end of the swivel 10, and a service conduit (not shown) is connected to the other end of the swivel. Thus, the swivel 10 allows for fluid communication to be maintained between the coiled tubing string and the service conduit while the coiled tubing is being wound upon or unwound from the reel.

The swivel body 12 includes a cylindrical receptacle 18 which is formed in one end thereof, a bore 20 which defines a flowpath through the body that communicates with the receptacle, and a port 22 which connects the flowpath to the exterior of the swivel body. The port 22 is connected to either the coiled tubing string or the service conduit using a conventional fitting 24 which is bolted and sealed to the swivel body 12. In the preferred embodiment of the invention, the receptacle 18 and at least a portion of the bore 20 are coaxial along a centerline $CL_1$, and a reduced diameter seal pocket 26 is formed in the swivel body 12 between the receptacle and the bore. In addition, the swivel body 12 preferably includes an annular first shoulder 28 which is formed between the seal pocket 26 and the receptacle 18 and an annular second shoulder 30 which is formed between the first shoulder and the receptacle. Furthermore, the swivel body 12 is optimally made of a strong, corrosion and erosion resistant material, such as 4140 Steel.

The mandrel 14 comprises a first end 32, a second end 34, a longitudinal hole 36 which extends between the first and second ends, an outer diameter surface 38, and an annular flange 40 which extends radially outwardly from the outer diameter surface proximate the first end. The hole 36 comprises an axial centerline $CL_2$ which in a preferred embodiment of the invention is aligned with the centerline $CL_1$ of the bore 20 of the swivel body 12. When the swivel 10 is assembled, the first end 32 extends into the seal pocket 26 and the flange 40 abuts or is closely adjacent to the first shoulder 28. In addition, the second end 34 of the mandrel 14 is connected to either the coiled tubing string or the service conduit by a conventional fitting 42, which is sealed to the second end and bolted to a split flange 44 that in turn is connected to the mandrel 14. Also, a suitable packing 46, such as is disclosed in U.S. Pat. No. 4,576,385, which is hereby incorporated herein by reference, is positioned between the seal pocket 26 and the mandrel 14 to provide a fluid and pressure tight seal between the mandrel and the swivel body 12. Furthermore, a leak detection port (not shown) may be provided in the swivel body 12 for purposes of observing the integrity of the packing 46. As with the swivel body 12, the mandrel is preferably constructed of a strong, corrosion and erosion resistant material, such as 174-PH Stainless Steel.

Figure 2:
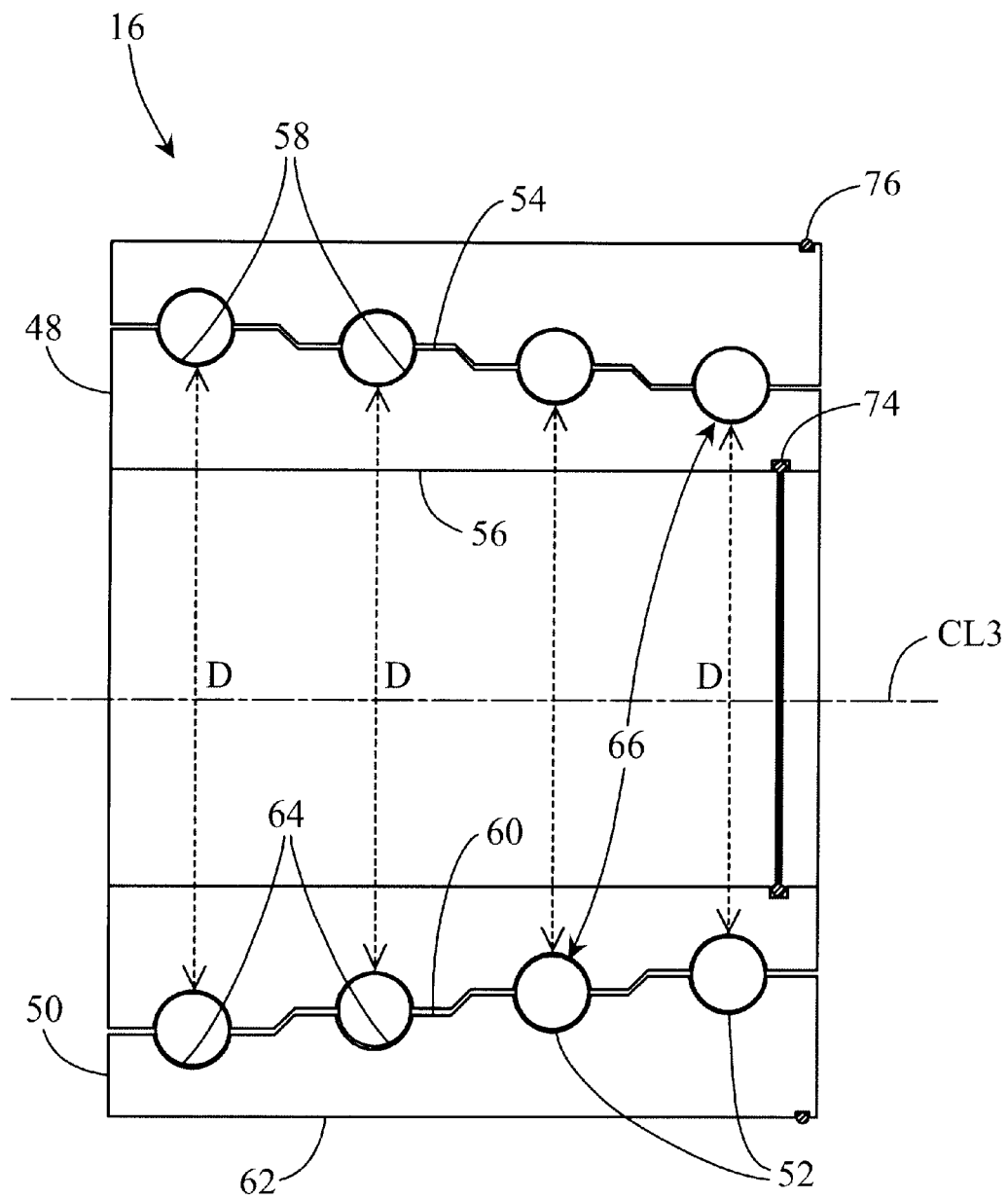
FIG. 2 is an enlarged longitudinal cross sectional view of the bearing assembly of the coiled tubing swivel depicted in FIG. 1.

Referring to FIG. 2, the bearing assembly 16 is shown to comprise an inner sleeve 48 which is rotatably secured within an outer sleeve 50 by a plurality of balls 52 in a manner that permits relative rotation between the inner and outer sleeves about an axial centerline $CL_3$. The inner sleeve 48 includes an annular outer surface 54 and a cylindrical inner surface 56 which has a diameter that is slightly smaller than the diameter of the outer surface 38 of the mandrel 14. The inner sleeve 48 also comprises a number of annular outer grooves 58 which are formed on the outer surface 54 coaxially with the centerline $CL_3$. Similarly, the outer sleeve 50 comprises an annular inner surface 60 and a cylindrical outer surface 62 which has a diameter that is slightly smaller than the diameter of the receptacle 18 of the swivel body 12. In addition, the outer sleeve 50 includes a number of annular inner grooves 64 which are formed on the inner surface 60 coaxially with the centerline $CL_3$. When the inner sleeve 48 is inserted into the outer sleeve 50, the outer and inner grooves 58, 64 align to form a plurality of bearing races 66 in which the balls 52 are disposed.

In a preferred embodiment of the invention, the outer surface 54 of the inner sleeve 48 and the inner surface 60 of the outer sleeve 50 are stepped as shown in the Figures. Consequently, the diameter D of each bearing race 66 will differ from that of the adjacent bearing race. Ideally, when the bearing assembly 16 is oriented in the swivel 10 as shown in FIG. 1, the diameter D of each bearing race 66 will be smaller than the diameter D of the adjacent bearing race which is closer to the first end 32 of the mandrel 14. In a more preferred embodiment of the invention, the diameter D of each bearing race 66 is designed so that, when the bearing races 66 are loaded with balls 52, each bearing race will hold one less ball than the adjacent bearing race which is closer to the first end 32 of the mandrel 14. In this manner, should the balls 52 or the bearing races 66 fail for any reason, the radial portions of the stepped inner and outer surfaces 60, 54 will engage and prevent the bearing assembly 16 from separating, which in turn will prevent the mandrel 14 from pulling out of the swivel body 12.

Referring again to FIG. 1, the swivel 10 is assembled by sliding the bearing assembly 16 over the mandrel 14 until the inner sleeve 48 engages the flange 40. After the packing 46 is inserted into the seal pocket 26 of the swivel body 12, the mandrel and bearing assembly are inserted into the receptacle 18 until the flange 40 engages or is proximate the first shoulder 28. In this position, the portion of the outer surface 38 of the mandrel 14 which is adjacent the first end 32 will sealingly engage the packing 46. A flange-shaped retainer 68 which includes an opening 70 for the mandrel 14 is then secured to the swivel body 12 by bolts 72 or similar means to retain the mandrel and bearing assembly in the receptacle 18. When so assembled, the flange 40 of the mandrel 14 will be trapped between the first shoulder 28 of the swivel body 12 and the inner sleeve 48 of the bearing assembly 16. However, the bearing assembly 16 will allow the mandrel 14 to freely rotate relative to the swivel body 12. Moreover, the packing 46 will isolate the bearing assembly 16 from fluid flowing through the mandrel 14 and the swivel body 12. Consequently, the bearing assembly 16 can be constructed of a material which is not necessarily compatible with the fluid. Ideally, the inner and outer sleeves 48, 50 of the bearing assembly 16 are made of a high hardness material such as 4715 Steel, which is available from Ryerson Tull, Inc. of Chicago, Ill.

Furthermore, suitable seals 74, 76 may be mounted on the inner surface 56 of the inner sleeve 48 and on the outer surface 62 of the outer sleeve 50 to seal against the mandrel 14 and the receptacle 18, respectively. Also, suitable seals 78, 80 may be mounted on the inner and outer surfaces of the retainer 68 to seal against the receptacle 18 and the mandrel 14, respectively. In addition, an appropriate seal 82 is preferably mounted on the flange 40 to seal against the swivel body 12. In this manner, the seals 74-82 will prevent fluid and debris from migrating between the inner and outer sleeves 48, 50 of the bearing assembly 16.

Also, a number of grease injection ports 84, 86 having conventional grease injection fittings secured therein may be provided to allow a suitable grease or other lubricant to be communicated to the bearing assembly 16. In addition, a washer 88 may be positioned between the bearing assembly 16 and the retainer 68 to restrict the longitudinal movement of the bearing assembly within the receptacle 18.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. A coiled tubing swivel for rotatably connecting a first conduit to a second conduit, one of the first and second conduits comprising a string of coiled tubing which is wound upon a reel, the swivel comprising:

a swivel body which includes a cylindrical receptacle, a port that communicates with the first conduit, a flowpath that extends between the receptacle and the port, and an annular shoulder that is located between the receptacle and the flowpath;

a tubular mandrel which is received within the receptacle and which includes a first end that is positioned proximate the shoulder, a second end that communicates with the second conduit, a longitudinal hole that extends between the first and second ends, an outer diameter surface, and a flange that extends radially outwardly from the outer diameter surface generally proximate the first end;

a bearing assembly which is positioned between the receptacle and the mandrel and which includes:
a central axis;
a cylindrical outer sleeve that comprises an inner surface and at least first and second annular inner grooves which are formed on the inner surface coaxially with the central axis;
a cylindrical inner sleeve that comprises an outer surface and at least first and second annular outer grooves which are formed on the outer surface coaxially with the central axis;
wherein the outer grooves align with respective inner grooves to define at least first and second bearing races; and
a plurality of balls that are disposed in the bearing races to rotatably secure the inner sleeve to the outer sleeve;

means for sealing the bearing assembly from the flowpath in the swivel body; and means for retaining the bearing assembly within the receptacle;

wherein the flange is positioned between the bearing assembly and the swivel body to secure the mandrel within the receptacle; and wherein the first bearing race comprises a diameter which is smaller than the diameter of the adjacent bearing race that is closer to the first end of the mandrel.

2. The coiled tubing swivel of claim 1, wherein the diameter of the first bearing race is selected such that the first bearing race will hold one less ball than the adjacent bearing race which is closer to the first end of the mandrel.

3. The coiled tubing swivel of claim 1, wherein the sealing means comprises an annular packing which is positioned between the outer diameter surface of the mandrel and the swivel body generally proximate the first end of the mandrel.

4. The coiled tubing swivel of claim 1, wherein the retaining means comprises a retainer which is attached to the swivel body proximate the bearing assembly and which includes an opening through which the mandrel extends.

5. A coiled tubing swivel for rotatably connecting a first conduit to a second conduit, the swivel comprising:

a swivel body having a cylindrical receptacle, a flowpath which communicates between the receptacle and the first conduit, and an annular shoulder which is located between the receptacle and the flowpath;

a tubular mandrel which is received within the receptacle and which includes a first end that is positioned proximate the shoulder and a second end that communicates with the second conduit; and a bearing assembly which is positioned between the receptacle and the mandrel and which comprises:
a central axis;
a cylindrical outer sleeve having an inner surface and at least first and second annular inner grooves which are formed on the inner surface coaxially with the central axis; and
a cylindrical inner sleeve having an outer surface and at least first and second annular outer grooves which are formed on the outer surface coaxially with the central axis;
wherein the outer grooves align with respective inner grooves to define at least first and second bearing races in which a plurality of balls are disposed to rotatably secure the inner sleeve to the outer sleeve; and
wherein the first bearing race comprises a diameter which is smaller than the diameter of the adjacent bearing race that is closer to the first end of the mandrel.

6. The coiled tubing swivel of claim 5, wherein the diameter of the first bearing race is selected such that the first bearing race will hold one less ball than the adjacent bearing race which is closer to the first end of the mandrel.

7. The coiled tubing swivel of claim 5, further comprising means for sealing the bearing assembly from the flowpath in the swivel body.

8. The coiled tubing swivel of claim 7, wherein the sealing means comprises an annular packing which is positioned between the mandrel and the swivel body generally proximate the first end of the mandrel.

9. The coiled tubing swivel of claim 1, wherein the inner surface of the outer sleeve comprises a first radial portion located between the first and second inner grooves, the outer surface of the inner sleeve comprises a second radial portion located between the first and second outer grooves, and the first and second radial portions are sized such that, upon a failure of the balls, the first radial portion will engage the second radial portion to thereby prevent the inner sleeve from separating from the outer sleeve.

10. The coiled tubing swivel of claim 5, wherein the inner surface of the outer sleeve comprises a first radial portion located between the first and second inner grooves, the outer surface of the inner sleeve comprises a second radial portion located between the first and second outer grooves, and the first and second radial portions are sized such that, upon a failure of the balls, the first radial portion will engage the second radial portion to thereby prevent the inner sleeve from separating from the outer sleeve.

* * * * *